(12) United States Patent
Beach

(10) Patent No.: US 8,416,735 B2
(45) Date of Patent: Apr. 9, 2013

(54) PERSONAL AREA NETWORKS

(75) Inventor: Robert Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 3216 days.

(21) Appl. No.: 10/649,207

(22) Filed: Aug. 27, 2003

(65) Prior Publication Data

US 2004/0076136 A1    Apr. 22, 2004

Related U.S. Application Data

(60) Provisional application No. 60/406,531, filed on Aug. 28, 2002.

(51) Int. Cl.
*H04W 4/00* (2009.01)

(52) U.S. Cl.
USPC .......... 370/328; 370/332; 370/338; 370/467; 370/469; 455/436

(58) Field of Classification Search .......... 370/328, 370/331, 332, 338, 465, 466, 467, 469; 455/436
See application file for complete search history.

(56) References Cited

U.S. PATENT DOCUMENTS

| | | | |
|---|---|---|---|
| 5,237,570 A | 8/1993 | Smolinske et al. | 370/95.1 |
| 5,297,142 A | 3/1994 | Paggeot et al. | 370/85.6 |
| 5,949,776 A | 9/1999 | Mahany et al. | |
| 6,119,179 A | 9/2000 | Whitridge et al. | 710/72 |
| 6,223,029 B1 | 4/2001 | Stenman et al. | 455/420 |
| 6,628,675 B1 * | 9/2003 | Neufeld | 370/503 |
| 7,075,912 B2 * | 7/2006 | Suda et al. | 370/331 |
| 2001/0010689 A1 * | 8/2001 | Awater et al. | 370/344 |
| 2003/0110484 A1 * | 6/2003 | Famolari | 717/173 |

FOREIGN PATENT DOCUMENTS

| | | |
|---|---|---|
| CN | 1253690 | 5/2000 |
| CN | 1316839 | 10/2001 |
| JP | 2002-185474 | 6/2002 |
| JP | 2002-186027 | 6/2002 |
| KR | 101027651 | 3/2011 |
| WO | 01/76089 A2 | 10/2001 |

OTHER PUBLICATIONS

Canadian Office Action for Canadian Patent Application No. 2,496,958 dated Sep. 23, 2009, a foreign counterpart.
Japanese Office Action for Japanese Patent Application No. 2004-531545 dated Sep. 8, 2009, a foreign counterpart.
English Translation of Japanese Office Action for Japanese Patent Application No. 2004-531545 dated Sep. 8, 2009, a foreign counterpart.
Office Action dated Feb. 21, 2011 in related Canada Patent Application 2,496,958.
Office Action dated Dece,ber 21, 2010 in related Europe Patent Application 03 749 155.2.
Notice of Allowance dated Aug. 15, 2012 in related Canadian application No. 2,496,958.

* cited by examiner

*Primary Examiner* — Christopher Grey

(57) ABSTRACT

A system is provided with mobile units that are arranged to conduct wireless data communications with access points following a first protocol, such as IEEE standard 802.11. The mobile units are further arranged for modified protocol communications with peripheral devices that permanently associate with a mobile unit.

18 Claims, 3 Drawing Sheets

PERSONAL AREA NETWORKS

CROSS-REFERENCE TO RELATED APPLICATIONS

The present application claims the benefit of U.S. provisional patent application No. 60/406,531, filed on Aug. 28, 2002.

BACKGROUND OF THE INVENTION

This invention relates to wireless data communications systems and in particular relates to a system for providing communications between a mobile unit (MU) and an one or more access points (AP) of a network and also for providing data communications between a mobile unit and a peripheral device.

There are currently two models for short to moderate distance wireless data communications. Wireless local area networks, such as specified by IEEE specification 802.11, are essentially extensions of a wired local area network. In such systems there are access points that bridge packets between the wired and wireless networks. Mobile units have network interface cards (NIC's), frequently as a plug in device, to provide communications to the local area network via an access point. The network interface card may be PCMCIA cards, compact flash cards or integrated hardware located within the mobile unit. The network interface card and access point communicate with each other in order to move data packets between the wired network and the mobile unit.

Another form of wireless data communications is the personal area network, such as specified by IEEE standard 802.15/Bluetooth. Such networks are typically very short range, such as a few meters, and are used primarily for communications between a wireless peripheral device and a mobile unit, such as a mobile computer. In accordance with the Bluetooth system one unit functions as a master device and the other as a slave device. The master is usually a mobile unit, such as PDA or a notebook computer, while the slaves may be peripheral type devices, such as a printer, keyboard, mouse, scanner, etc.

Using existing technology, wireless local area networks (WLANs) are typically based on a standard such as IEEE 802.11, wherein mobile units become associated with access points and communicate with a wired network or a computer located on the wired network via the access point. The term "network" is intended to mean at least one computer connected for data communications to at least one access point. Personal area networks (PANs) on the other hand are usually based on a master/slave protocol, such as the Bluetooth protocol.

When it is desired to have a mobile unit communicate with both a wired network and a peripheral device, two distinct radios are required. The requirement for two radio systems adds cost and reduces the performance of both networks. It is known that the 802.11 and Bluetooth systems can interfere with each other, a fact that can only be partially compensated by using various "co-existence" algorithms. In addition, the use of two radios adds to the complexity, weight, and power requirements of a mobile unit.

As used in this application the term "Access point" is intended to include equivalent arrangements, such as that disclosed in copending application Ser. No. 09/528,697, filed Mar. 17, 2000, the specification of which is incorporated herein by reference, and is owned by the assignee of this application. As described in that application conventional 802.11 Access Points are replaced with a combination of an RF port and a cell controller, and wherein certain MAC functions of conventional access points are performed in the cell controller.

It is an object of the present invention to provide a method for data communications and an apparatus which provides both WLAN and PAN services using a single radio for both functions.

SUMMARY OF THE INVENTION

In accordance with the invention there is provided a method for wireless data communications between a mobile unit and an access point of a network and between the mobile unit and at least one peripheral device. The mobile unit is provided with a data communications device that includes an interface to a host processor of the mobile unit, a data communications digital processor, including a control program and a radio transmitter and receiver. The data communications device is operated in a first WLAN mode to associate with the access point and engage in data communications with the network via the access point using the first communications protocol. The data communications device is operated in a second personal area communications mode, wherein the data communications device communicates with the peripheral device using a modification of the first data communications protocol. The second mode includes operating the data communications device as a master device and permanently associating with at least one peripheral device.

In a preferred arrangement of the method, the data communications device is operated in the second mode with a radio transmitter power at a selected power level that is lower than the power level used for operating in the first data communications mode. The control program is preferably arranged to operate the data communications device in the first and second modes. In the second mode the data communications device may be operated to reassociate with the peripheral device. The data communications device may include a power saving operational mode wherein the device is inactive for selected periods of time. In such case the control programs includes instructions to cause the data communications device to synchronize the selected periods of time with the peripheral device.

In accordance with the invention there is provided a system for providing wireless data communications. The system includes at least one access point connected to at least one computer for providing wireless data communications between the computer and at least one mobile unit. The access point acts as a master device using a first data communications protocol to receive association requests from mobile units and to form one or more associations with mobile units for data communication therewith. At least one mobile unit is provided including a host processor and a first data communications device. The data communications device includes a first data communications digital processor having a first control program and a first radio for sending and receiving data. At least one peripheral device is provided including a second data communications device. The second data communications device includes a second data communications digital processor having a second control program and a second radio. The first control program is arranged to send association requests to access points according to the first communications protocol using the first radio and to provide data communications to and from the computer by at least one access point connected thereto. The first control program includes an initiating program wherein the first data communications device receives initiation requests from the second data communications device and forms a permanent association therewith using a modification of the first data communications protocol.

In a preferred arrangement the first control program includes a first reassociation program whereby the first communications device receives reassociation requests from said at least one peripheral device permanently associated therewith and wherein the first communication device thereafter engages in data communications with the at least one peripheral device. The first reassociation program may be operative when the mobile unit is powered up and where the at least one peripheral device has previously become permanently associated with the first communications device. The second control program may include a second reassociation program wherein the second reassociation program is operative to cause the second data communications device to send reassociation requests when the at least one peripheral device is powered up.

In a preferred arrangement the second control program includes a network communications program to cause the at least one peripheral device to become associated with an access point connected to a network including the at least one computer and to engage in data communications using the first communications protocol. In this arrangement the first control program may be arranged to cause the first data communication device to communicate directly with the peripheral device when the first communications device is in direct communications with the second communications device and to communicate with the second communications device via the network when the first communications device is not in direct communication with the second communications device. The second communications device may include a radio transmitter arranged to transmit at a first higher power level when communicating with an access point using the first data communications protocol and to transmit at a second lower power level when communicating directly with an associated mobile unit. Likewise, the first data communications device may include a radio transmitter arranged to transmit at a first higher power level when communicating with the at least one access point using the first data communications protocol and to transmit at a second lower power level when communicating directly with an associated peripheral device.

In accordance with the invention there is provided a mobile unit that includes a host processor and a data communications device. The data communications device includes a data communications digital processor having a control program and a radio for sending and receiving data. The control program is arranged to send association requests to an access point according to a first data communications protocol using the radio and to provide data communications to and from a computer via an access point connected thereto. The control program further includes an initiating program whereby the data communications device receives an initiation request from a peripheral device and forms a permanent association therewith using a modification of the first communications protocol.

The mobile unit preferably includes a reassociation program whereby the communications device receives a reassociation request from a peripheral device permanently associated therewith and whereby the first communications device thereafter engages in data communications with the peripheral device. The reassociation program may be operative when the mobile unit is powered up.

In accordance with the invention there is provided a peripheral device including a data communications device. The data communications device includes a data communications digital processor having a control program and a radio. The control program is arranged to cause the data communications device to be permanently associated with a data communications device on a mobile unit and conduct data communications therewith.

In a preferred arrangement of the peripheral device, the control program is further arranged to cause the communications device to send reassociation requests and to reassociate with a mobile unit communications device. The control program may be arranged to cause the communications device to permanently associate with the mobile unit communications device upon initial operation thereof and to send reassociation request upon subsequent power up of the peripheral device. The peripheral device control program may be arranged to send reassociation requests when it fails to receive data communication signals from the mobile unit. The peripheral device control program may be further arranged to cause the communications device to associate with an access point of a network.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
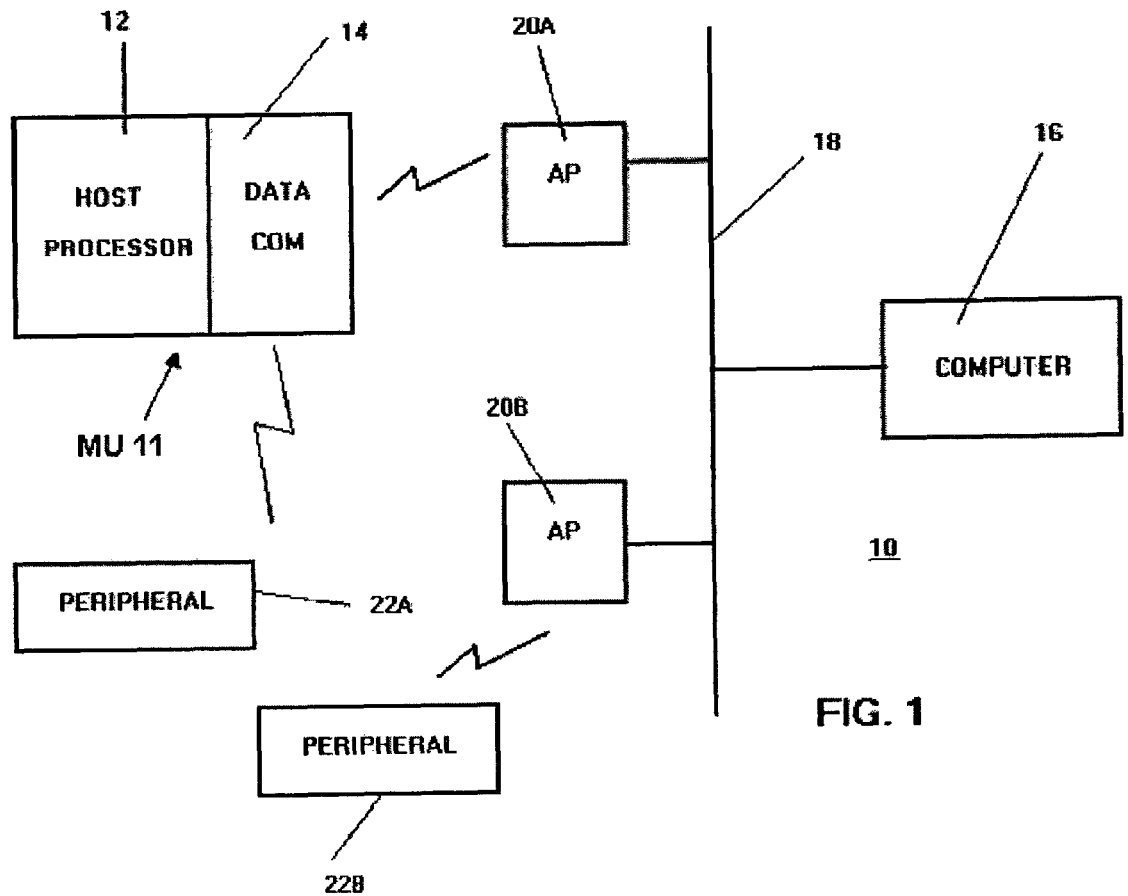
FIG. 1 is a block diagram illustrating a system in accordance with the present invention.

Referring to FIG. 1 there is shown a block diagram of a system 10 in accordance with the present invention for providing wireless data communications. The system 10 illustrated in FIG. 1 includes a wired network 18, such as a local area network, which includes at least one computer 16 and one or more access points 20. The system illustrated in FIG. 1 includes access points 20A and 20B. In the local area network 18 illustrated in FIG. 1 additional elements may be included, such as an internet portal, peripheral devices, and a telephone interface, all of which are not illustrated. Those skilled in the art will recognize that rather than using self-contained access points 20A and 20B as shown in FIG. 1 the system may use a cell controller and RF ports as a substitute for one or more access points following the teachings of the commonly owned co-pending application Ser. No. 09/528,697, filed Mar. 17, 2000. In connection with the description of the present invention, it should be understood that the term access points includes self-contained access points following a specified protocol for wireless communications, such as IEEE standard 802.11 or the equivalent following the same or a similar standard, such as the combination of RF ports and cell controllers as described in the co-pending application.

The system 10 of the present invention includes a mobile unit 11 that includes a host processor 12 and a data communications device 14 interfaced to the host processor 12. Data communications device 14 may, for example, be a network interfaced controller (NIC) card, or similar component, which is part of mobile unit 11. The mobile unit 11, including its host processor 12 and data communications device 14 may, for example, take the form of a personal digital assistant (PDA), network telephone, or laptop computer equipment for wireless data communications. The system 10 of FIG. 1 further includes peripheral devices 22A and 22B. It will be recognized by those skilled in the art that the peripheral devices 22 may include such devices as a wireless mouse, a memory device, such as a CD ROM reading device, a printer, a removable disk memory, a keyboard or other peripheral device connected to mobile unit 11 by a wireless data communications link.

One example of a system in accordance with the present invention may be a system for use in a retail establishment. For example, mobile unit 11 may be a PDA type device carried by a sales associate. Using the host processor 12 and data communications device 14 of the mobile unit 11 a sales person can communicate via an access point 20A with the computer 16 over the wired network 18 of the retail establishment in order to obtain information for a customer, such as availability of colors and delivery dates. Additionally using an interface of the network 18 the sales person may be able to communicate beyond local area network 18, for example, to obtain credit information on a customer or to obtain detailed information concerning a product that the customer is interested in, for example via the internet.

In connection with completing a sales transaction it may be desirable that mobile unit 11 communicate with peripheral devices 22A, 22B for purposes of completing a sales transaction. For example one interface device 22 may be a keyboard through which sales information concerning a product may be entered. Alternatively, one peripheral device may be a bar code reader for reading a product identification bar code from a floor sample of the product. Additional peripheral devices that may be used in a retail environment may include, for example, a credit card magnetic stripe reader, a data display or a printer for printing a sales receipt.

As described above, prior to the present invention, separate data communication devices has been used to communicate data from a mobile unit 11 to a wired local area network 18 by an access point using a protocol such as IEEE 802.11. In addition, prior devices have used standard 802.15/Bluetooth for communication with peripheral devices 22. The present invention provides a single data communications device 14 for use in mobile unit 11 and coordinated with the arrangement of the system 10 and peripheral devices 22 to use similar wireless data communications protocols for communications both with access points 20 and peripheral devices 22. The arrangement of the present invention achieves both types of communications by a selection of embedded software in the processor of data communications device 14 of the mobile unit 11 and the data communications device 64 in peripheral device 22. The wireless local area network that includes access point 20, local area network 18 and computer 16 operates according to an established standard, such as IEEE 802.11 for communications with mobile unit 11. Communications between mobile unit 11 and peripheral devices 22 preferably use a modification of that standard which is achieved by a modification of the software in the mobile unit 11 communications processor and by provision of special software in the communication processors of peripheral devices 22, as will be further described.

The inventors of the present invention have given consideration to the communications protocol requirements of the system 10. These are the communications between mobile unit 11 and access points 20 and communications between mobile unit 11 and peripheral devices 22. Communications with the access points, for example, following standard 802.11 include the function of roaming whereby, when a mobile unit moves from an area within range of communication with a first access point 20A to another area within range of another access point 20B, the roaming function of standard 802.11 causes mobile unit 11 to reassociate with a different access point 20 for further data communications. In connection with communications with peripheral devices 22, such as the communications provided by the Bluetooth system, the devices are required to communicate over only a very short range, for example 10 meters or less. Usually it is assumed that the peripheral devices are within such range of the mobile unit, and accordingly the roaming and association functions of standard 802.11 are not required. Applying these protocol requirements, the inventors have discovered that a modified communications protocol similar to standard 802.11 can be used for providing short-range communications between mobile unit 11 and peripheral devices 22. The particular characteristics of this modified 802.11 standard include a permanent or quasi-permanent association between the peripheral device 22 acting as a mobile unit and the mobile unit 11 acting as an access point for the peripheral devices. Accordingly, if the mobile unit is out of range of the peripheral devices for data communications in either direction the peripheral devices do not seek to associate with a different mobile unit, but await the opportunity to reacquire their association with the mobile unit with which they are permanently associated.

The term "permanent association" is intended to mean an association that is relatively long term or that requires positive action by the operator to change. Typically a peripheral device, such as a keyboard may be used with only a single mobile unit. If a new or replacement mobile unit is put into operation, a new "permanent association" may be established by the operator, for example, by a specially addressed command to re-establish the association. The permanent association is intended to survive power-down of either unit or movement of the units out of range of each other.

Following the model upon which the present invention is based, when initially activated or when initially configured, a semi-permanent association takes place whereby the peripheral devices become associated with the data communications device in a particular mobile unit, which is acting as an access point or master unit for purposes of the modified 802.11 protocol. In addition, the roaming feature of the peripheral device, by which it may tend to seek association with a different unit it is not active.

A feature of the present invention is that when the mobile unit is powered down, the peripheral devices remain in a state by which they continue to seek the permanently associated mobile unit for a reassociation function to renew the permanent association previously initiated. Likewise when the peripheral devices are powered down and then repowered they will seek a reassociation with the same mobile unit with which they had been previously associated.

Another feature of the system 10 in accordance with the present invention is that since the peripheral devices need only engage in short range data communications with the mobile unit 11, such as 10 meters or less, the transmitter power of the peripheral devices 22 and the mobile unit data communications device 14, when communicating with each other, need not have the same transmitter power level as the mobile unit uses in connection with potentially longer range communications with access points 20, which may typically be spaced apart by a distance larger than 10 meters, for example 30 or 40 meters. Accordingly when operating in the mode for communication with peripheral devices 22, the data communications device 14 of mobile unit 40 will use a lower transmitter power. Likewise, a lower transmitter power will be used by the communications devices of peripheral devices 22 when communicating with mobile unit 11. Such lower power operation may be provided, for example, by not using the transmitter power amplifier stage.

Optionally peripheral devices 22 may also be arranged to communicate with the local area network 18 through a separate association, for example between access point 20B and peripheral device 22B. Accordingly, it is an optional feature of the invention that when mobile unit 11 is not within range for direct communication with peripheral device 22B it may send (or receive) a data message to peripheral device 22B via access point 20A, network 18 and access point 20B with which peripheral device 22B is associated.

Figure 2:
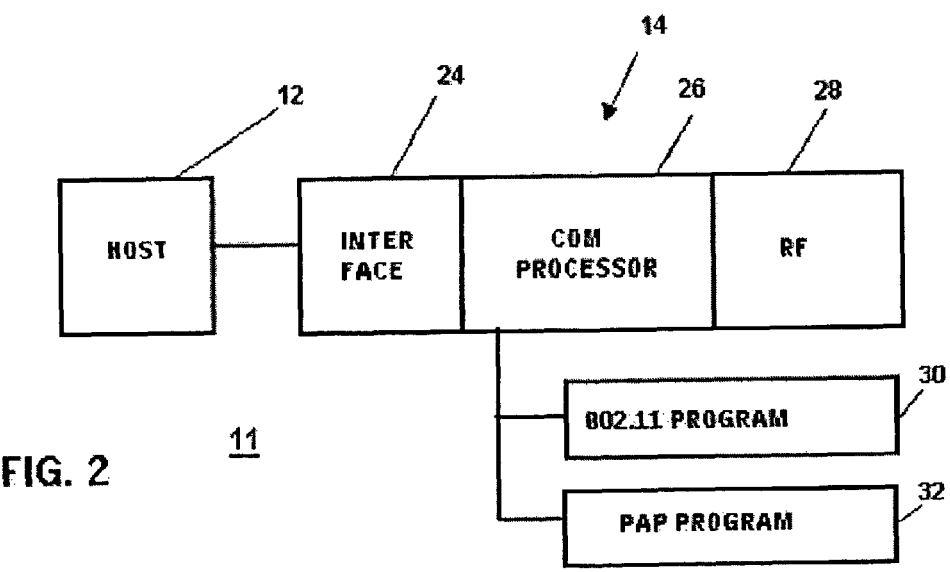
FIG. 2 is a block diagram of a mobile unit usable in the system of FIG. 1.

Referring to FIG. 2 there is shown a block diagram of an exemplary embodiment of a mobile unit in accordance with the present invention. The mobile unit 11 includes a host processor 12, which may, for example, be the host processor of a laptop computer, a PDA, or even a host processor for a telephone communication set. The host processor 12 is conventionally interfaced by interface circuitry 24 to a data communications device 14.

Data communications device 14 further includes a communications processor 26, which may be a programmed microprocessor or a digital signal processor, and an RF unit 28, which may include baseband processing for signals, transmitter, receiver and antenna and associated circuitry for RF data communications. Such devices are well known in the art and available from a number of vendors. The communications processor 26 includes alternate programs 30 and 32. Program 30 is a conventional 802.11 standard program for formatting and communicating data using standard 802.11 via the RF circuit 28. Program 32 is a personal access point (PAP) program for operating the communications device 14 as a personal communications access point for 802.11-like communications with peripheral devices 22.

When the mobile unit 11 operates as a peripheral attachment point for communication with peripheral devices 22, the communications processor 26 interfaces with the operating systems of the host 12 as a peripheral connection, such as USB. The communications device 14 becomes "a master" device for one or more peripherals. For communications with access points 20 the communications device 14 acts as a client device.

The peripheral attachment point software 32 has some changes from the standard 802.11 protocol. The first change is that the association of a peripheral device to the communications device 14 of a mobile unit is a long-term association that survives the absence or power down of either device. The peripheral devices accordingly do not undertake the conventional roaming function typical of standard 802.11 protocol. Reassociation of a peripheral device with another mobile unit requires an individual and special reconfiguration of the unit to do another long-term or quasi-permanent association. When either the mobile unit 11 or peripheral device 22 is powered down or becomes out of range for communication it becomes necessary to perform what is termed a reassociation function. For this purpose the mobile unit, acting as a peripheral access point may provide a beacon from which the peripheral device can determine that it is within communication range of the mobile unit with which it has a long-term association and the peripheral device can thereafter reassociate itself with the same mobile unit with which it had been previously associated.

Figure 3:
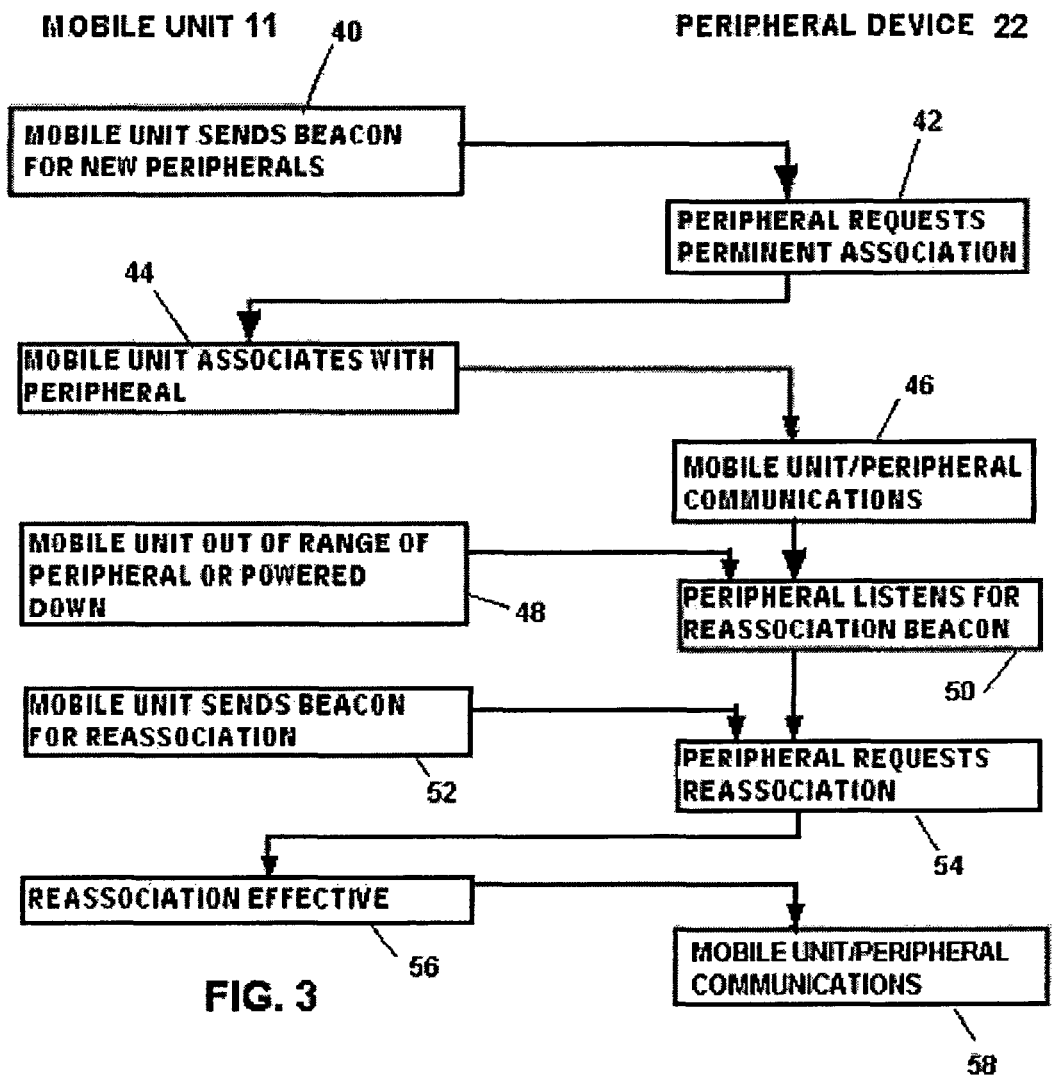
FIG. 3 is a flow diagram illustrating a process in accordance with the present invention.

Referring to FIG. 3 there is a shown a flow diagram of a process by which association and reassociation may take place between a peripheral unit 22 and a mobile unit 11. Initially mobile unit 11 may be caused to send a beacon to determine if there are any new peripherals seeking association with the mobile unit, which is shown at step 40 of FIG. 3. At step 42 a peripheral unit may request a permanent (i.e., long-term) association. At step 44 the mobile unit associates with the peripheral and thereafter at step 46 carries on data communications with the peripheral, for example, sending data to be printed by a peripheral unit that is a printer.

At step 48 the mobile unit may determine that it is out of range from the peripheral or that it is powered down. At step 50 the peripheral determines that it no longer has reliable data communications with the mobile unit with which it is long-term associated and thereafter the peripheral periodically listens for a reassociation beacon from the mobile unit. At step 52, representing the condition where the mobile unit has moved within range of the peripheral, or has been powered up again after being turned off, the mobile unit sends a beacon seeking reassociation with the peripheral. At step 54 the peripheral requests reassociation, which is affected by the mobile unit at step 56 whereby mobile unit/peripheral communications again take place at step 58.

Figure 4:
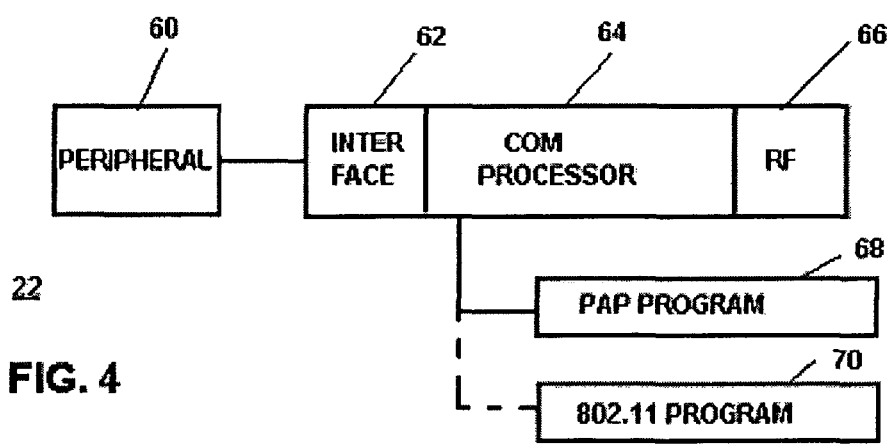
FIG. 4 is a block diagram illustrating a peripheral device in accordance with the present invention.

Referring to FIG. 4 there is shown a block diagram of an exemplary arrangement for a peripheral device in accordance with the invention. The peripheral device 22 includes peripheral element 60, such as a printer, a bar code scanner or the like. Such devices may or may not include their own host processor according to the function of the device. The peripheral unit 60 is interfaced by interface circuit 62 to a communications processor 64 and an RF unit 66. The interface 62, communications processor 64 and RF unit 66 are otherwise similar to the devices of the communications device 14 shown in FIG. 11. As noted above, the RF unit may operate at a lower power level than usually used for 802.11 protocol communications because of the short range involved.

The communications device of the peripheral device includes the PAP program 68 which interfaces with PAP program 32 of the communications processor 26 of the mobile unit 11. Optionally, as will be described below, peripheral device 22 may include an 802.11 program 70 for separate communications between peripheral device and an access point 20 of the network 18.

Figure 5:
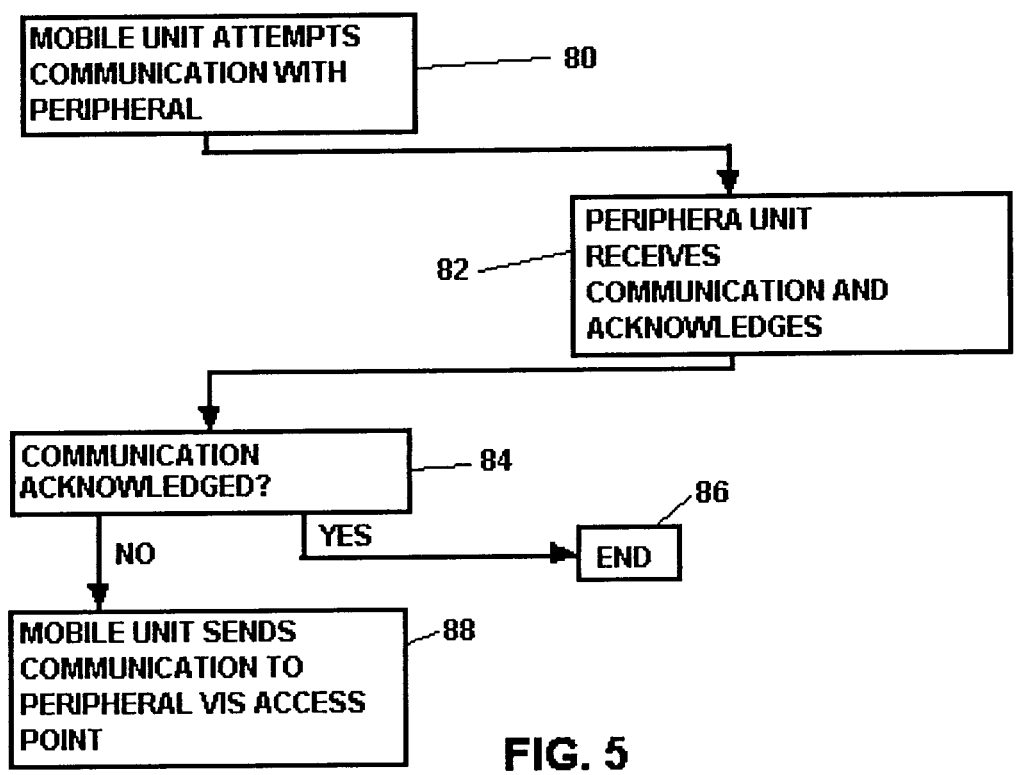
FIG. 5 is flow diagram illustrating a further process in accordance with the present invention.

One possible process for the use of direct communications between a peripheral device 22 and an access point 20 of network 18 is shown in FIG. 5. In the method shown in FIG. 5, the mobile unit may attempt communications with a peripheral device at step 80. At step 82, assuming the peripheral device is within range of the mobile unit, the peripheral unit receives the communication and acknowledges the communication. At step 84 the mobile unit determines whether or not the communications have been acknowledged. This determination may be made after one or more repeated attempts for direct communication between the mobile unit 11 and the peripheral device 22. If the communication has been successful the process ends at step 86. If the communication has not been successful, for example because the peripheral device is out of range, the mobile unit may send a communication to the peripheral device via an access point 20 and through the network 18 at step 88. Accordingly the operator of a mobile unit, such as a computer, can cause an associated printer to print a file even if the mobile unit is outside of the personal access point communication range with the peripheral device.

One feature of the present invention is a facilitated security model. The association between the peripheral device and the mobile unit is long-term and does not involve roaming. Accordingly the peripheral device and the mobile unit, using their data communications processors, can exchange secret information that is stored on both devices. This information can be used for encryption and/or authentication purpose.

An additional optional feature of the invention is that the PAP software in the Mobile Unit 11, the peripheral device 22 or both may implement the PSP power save mode of operation. In this instance, the Mobile Unit, as master device for the PAP communications with the peripheral device would synchronize its "sleep mode" and "wake-up" time with the peripheral device.

It should be recognized that in some arrangements it may be desirable for a peripheral device to operate with more than one mobile unit. In this case the PAP software of the peripheral device may operate as multiple "virtual" peripheral devices, each with its own protocol access address and each associated on a long term basis with the PAP software of a different mobile unit.

While there have been described various embodiments of the invention, those skilled in the art will recognize that other changes and modifications may be made thereto without departing from the spirit of the invention, and it is intended to claim all such changes and modifications as fall within the true scope of the invention.

I claim:

1. A method for providing wireless data communications between a mobile unit and an access point of a network and between said mobile unit and at least one peripheral device, comprising:
   providing said mobile unit with a data communications device, said data communications device including an interface to a host processor of said mobile unit, a data communications digital processor including a control program, and a radio transmitter and receiver;
   operating said data communications device in accordance with said control program in a first WLAN mode to send association requests to said access point according to a first data communications protocol using said radio transmitter and to provide data communications with said network via said access point using said radio transmitter and receiver;
   operating said data communications device in accordance with an initiating program included in said control program in a second personal area communications mode, wherein said data communications device receives initiation requests from said at least one peripheral device and forms a permanent association therewith using a modification of said first data communication protocol such that said first data communication device communicates directly with said at least one peripheral device using said radio transmitter and receiver.

2. A method as specified in claim 1 wherein said second mode includes operating said data communications device as a master device for said at least one peripheral device.

3. A method as specified in claim 1 wherein operating said data communications device in said second mode includes operating said radio transmitter at a selected power level lower than a power level used for operating in said first data communications mode.

4. A method as specified in claim 1 further wherein said control program is arranged to operate said data communications device in said first and said second modes.

5. A method as specified in claim 1 wherein operating said data communications device in said second mode includes re-associating with said at least one peripheral device.

6. A method as specified in claim 1 wherein said data communication device includes a power saving operational mode wherein said device is inactive for selected periods of time and wherein said control program includes instructions to cause said data communications device to synchronize said selected periods of time with said peripheral device.

7. A system for providing wireless data communications, comprising:
   at least one access point connected to at least one computer for providing wireless data communications between said at least one computer and at least one mobile unit, said access point using a first data communications protocol to receive association requests from mobile units and to form one or more associations with mobile units for data communications therewith;
   at least one mobile unit including a host processor and a first data communications device, said first data communications device including a first data communications digital processor having a first control program and a first radio for sending and receiving data;
   at least one peripheral device including a second data communications device, said second data communications device including a second data communications digital processor having a second control program and a second radio;
   wherein said first control program is arranged to send association requests to access points according to the first data communications protocol using said first radio and to provide data communications to and from said computer via at least one access point connected thereto;
   wherein said first control program includes an initiating program whereby said first data communication device receives initiation requests from said at least one peripheral device and forms a permanent association therewith using a modification of said first data communication protocol such that said first data communication device communicates directly with said at least one peripheral device using said first radio.

8. A system as specified in claim 7 wherein said access point acts as a master device for said at least one peripheral device.

9. A system as specified in claim 7 wherein said first control program includes a first reassociation program whereby said first communication device receives reassociation requests from said at least one peripheral device permanently associated therewith, and whereby said first communication device thereafter engages in data communications with said at least one peripheral device.

10. A system as specified in claim 9 wherein said first reassociation program is operative when said mobile unit is powered up and wherein said at least one peripheral device has previously become permanently associated with said first communication device.

11. A system as specified in claim 9 wherein said second control program includes a second reassociation program, and wherein said second reassociation program is operative to cause said second data communications device to send reassociation requests when said at least one peripheral device is powered up and wherein said at least one peripheral device has previously become permanently associated with said first communication device.

12. A system as specified in claim 9 wherein said first data communications device includes a radio transmitter arranged to transmit at a first higher power level when communicating with said at least one access point using said first data communications protocol and to transmit at a second lower power level when communicating directly with an associated peripheral device.

13. A system as specified in claim 7, wherein said second control program includes a network communication program to cause said at least one peripheral device to become associated with an access point connected to a network including said at least one computer and to engage in data communications using said first communications protocol.

14. A system as specified in claim 13 wherein said first control program is arranged to cause said first data communications device to communicate directly to said peripheral device when said first communications device is in direct communication with said second communication device and to communicate with said second communication device via said network when said first communication device is not in direct communication with said second communication device.

15. A system as specified in claim 13 wherein said second data communications device includes a radio transmitter arranged to transmit at a first higher power level when communicating with an access point and at a second lower power level when communicating directly with an associated mobile unit.

16. A mobile unit including a host processor and a data communications device, said data communications device including a data communications digital processor having a control program and a radio for sending and receiving data, wherein said control program is arranged to send association requests to access points according to a first data communications protocol using said radio and to provide data communications to and from a computer via at least one access point connected thereto, and wherein said control program includes an initiating program whereby said data communication device receives initiation requests from a peripheral device and forms a permanent association therewith using a modification of said first data communication protocol.

17. A mobile unit as specified in claim 16 wherein said control program includes a reassociation program whereby said communication device receives reassociation requests from said peripheral device permanently associated therewith, and whereby said first communication device thereafter engages in data communications with said peripheral device.

18. A mobile unit as specified in claim 17 wherein said reassociation program is operative when said mobile unit is powered up.

* * * * *